(12) United States Patent
Huang (10) Patent No.: US 12,495,217 B2
(45) Date of Patent: Dec. 9, 2025

(54) MULTI-MODULE IMAGING SYSTEM AND IMAGE-SYNCHRONIZATION METHOD

(71) Applicant: Getac Technology Corporation, New Taipei (TW)

(72) Inventor: Cheng-Liang Huang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 43 days.

(21) Appl. No.: 18/604,975

(22) Filed: Mar. 14, 2024

(65) Prior Publication Data

US 2025/0106527 A1    Mar. 27, 2025

(30) Foreign Application Priority Data

Sep. 27, 2023 (CN) .......................... 202311264655.5

(51) Int. Cl.
*H04N 23/80* (2023.01)
*G06V 20/40* (2022.01)
(Continued)

(52) U.S. Cl.
CPC ............ *H04N 23/80* (2023.01); *G06V 20/41* (2022.01); *G06V 20/625* (2022.01); *G06V 30/20* (2022.01);
(Continued)

(58) Field of Classification Search
CPC ........ H04N 23/80; H04N 5/265; H04N 7/183; H04N 19/44; H04N 23/11; H04N 23/45;
(Continued)

(56) References Cited

U.S. PATENT DOCUMENTS

| | | | |
|---|---|---|---|
| 5,438,360 A * | 8/1995 | Edwards .............. | H04N 23/683 348/208.4 |
| 9,930,316 B2 * | 3/2018 | Zhang .................. | H04N 25/135 |

(Continued)

FOREIGN PATENT DOCUMENTS

| | | |
|---|---|---|
| CN | 103402044 A | 11/2013 |
| CN | 105472226 A | 4/2016 |

(Continued)

OTHER PUBLICATIONS

Search Report issued on Aug. 22, 2024 for EP application No. 24165062.1, 11 pages.

*Primary Examiner* — Marnie A Matt
(74) *Attorney, Agent, or Firm* — Cooper Legal Group, LLC (57) ABSTRACT

A multi-module imaging system and an image-synchronization method are provided. The multi-module imaging system includes a photographic component having multiple photosensitive modules, an image signal processor and a data processor. The different photosensitive modules generate multiple sets of motion images respectively. The image signal processor then retrieves continuous frame images from each of the sets of motion images. The data processor obtains multiple frames generated at the same time from the continuous frame images and generates a composite frame that vertically combines the multiple frames by performing a vertical encoding procedure. Therefore, the multiple sets of motion images are encoded to be continuously-outputted (Continued)

multiple composite frames. Accordingly, the multi-module imaging system can synchronously output the frames that are generated by different photosensitive modules.

20 Claims, 7 Drawing Sheets

(51) Int. Cl.
 *G06V 20/62*  (2022.01)
 *G06V 30/20*  (2022.01)
 *H04N 5/265*  (2006.01)
 *H04N 7/18*  (2006.01)
 *H04N 19/44*  (2014.01)
 *H04N 23/11*  (2023.01)
 *G06V 30/14*  (2022.01)

(52) U.S. Cl.
 CPC ............. *H04N 5/265* (2013.01); *H04N 7/183* (2013.01); *H04N 19/44* (2014.11); *H04N 23/11* (2023.01); *G06V 30/141* (2022.01)

(58) Field of Classification Search
 CPC ...... G06V 20/41; G06V 20/625; G06V 30/20; G06V 30/141
 USPC .......................................................... 348/164
 See application file for complete search history.

(56) References Cited

U.S. PATENT DOCUMENTS

| | | | |
|---|---|---|---|
| 2014/0267593 A1* | 9/2014 | Kim ..................... | H04N 23/698 |
| | | | 348/36 |
| 2016/0232410 A1* | 8/2016 | Kelly .................... | G06V 30/224 |
| 2018/0107892 A1* | 4/2018 | Istenes ................... | G06V 20/63 |
| 2019/0147306 A1 | 5/2019 | Hoshino | |
| 2021/0235011 A1 | 7/2021 | Zhao et al. | |
| 2023/0260397 A1* | 8/2023 | Shen ..................... | G06V 10/82 |
| | | | 382/105 |

FOREIGN PATENT DOCUMENTS

| | | | | |
|---|---|---|---|---|
| CN | 108574808 A | 9/2018 | | |
| CN | 113225491 A | 8/2021 | | |
| JP | 201754408 A | 3/2017 | | |
| TW | 201328358 A1 | 7/2013 | | |
| TW | 201703503 A | 1/2017 | | |
| TW | 201820862 A | 6/2018 | | |
| TW | 202025716 A | 7/2020 | | |
| WO | WO-9406247 A1 * | 3/1994 | ............ | H04N 25/00 |
| WO | 2016125014 A1 | 8/2016 | | |

* cited by examiner

MULTI-MODULE IMAGING SYSTEM AND IMAGE-SYNCHRONIZATION METHOD

CROSS-REFERENCE TO RELATED PATENT APPLICATION

This application claims the benefit of priority to China Patent Application No. 202311264655.5, filed on Sep. 27, 2023, in the People's Republic of China. The entire content of China Patent Application No. 202311264655.5 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a synchronous image output technology, and more particularly to a multi-module imaging system and an image-synchronization method that stitch multiple images outputted by an image signal processor so as to achieve image synchronization.

BACKGROUND OF THE DISCLOSURE

A conventional automatic license plate recognition (ALPR) system of a vehicle can be equipped with a plurality of light-sensing modules, such as infrared sensors and visible-light sensors that can be used to capture color images, so as to simultaneously capture images of scenes and license plates of the other vehicles in front of the vehicle. The visible-light sensor is used to capture the color images covering the other vehicles and the surroundings. However, the license plate recognition would be erroneous since the color images are easily affected by changes of ambient light. Therefore, the infrared sensor is also used to capture an infrared image of the license plate. The infrared image will not be affected by the ambient light. Even if under a low light source and bad weather conditions, the infrared sensor is still able to capture a clear license plate image that can be correctly recognized, thereby improving the license-plate recognition performance.

For example, a camera installed in a police vehicle is equipped with the automatic license plate recognition system that can automatically detect and recognize the license plate of the vehicle in front of the police vehicle. If the vehicle ahead uses the license plate that can reflect light, when headlights of the police vehicle illuminate on the front license plate, this front license plate will cause glare that affects the accuracy of license-plate recognition. Therefore, the infrared sensor is used in the ALPR system for filtering out the glare, so as to capture a clear image of the license plate.

The images respectively generated by the infrared sensor and the visible-light sensor are individually compressed and outputted. When the images are separately decompressed, the system is required to ensure that the images were taken at the same time by synchronously outputting the images. In the conventional ALPR system, an in-vehicle imaging system that adopts both the infrared sensor and the visible-light sensor is used. The in-vehicle imaging system is required to process the images respectively captured by the infrared sensor and the visible-light sensor. Circuits and software of the in-vehicle imaging system are used to resolve the issue of synchronization of the images. For example, an output timecode or a timestamp of each of the images can be referred to for conducting synchronization of the images. However, the process of synchronization of the images needs to be performed on a device with a powerful computing capability, and consumes substantial computing and time resources.

SUMMARY OF THE DISCLOSURE

In response to the above-referenced technical inadequacies of the conventional technologies that require a greater computing capability to perform image synchronization when processing images generated by multiple light-sensing modules that is not suitable for an edge device (e.g., a drive recorder) with a poor computing capability, provided in the present disclosure is an image-synchronization method that can be performed by a device with less computing capability and a multi-module imaging system performing the same.

The multi-module imaging system includes a camera assembly including multiple light-sensing modules, an image signal processor and a data processor. The multi-module imaging system performs the image-synchronization method.

In the image-synchronization method, the camera assembly having the multiple light-sensing modules is used to generate multiple sets of motion images. The image signal processor extracts a set of continuous frame images from one of the sets of motion images generated by each of the light-sensing modules of the camera assembly. Multiple sets of continuous frame images are formed from the multiple sets of motion images generated by different light-sensing modules.

Next, the data processor generates a composite frame by combining multiple frame images that are captured at the same time and extracted from the multiple sets of continuous frame images. The multiple sets of motion image can be encoded into multiple continuously-outputted multiple composite frames. Each of the composite frames includes multiple frame images generated by the camera assembly at the same time. The multi-module imaging system can synchronously output the frame images generated by the different light-sensing modules.

After the multiple sets of motion images are obtained, the image signal processor performs an image-processing procedure on each of the multiple sets of motion images. The image-processing procedure includes one or any combination of noise reduction, color correction, white balance adjustment, contrast adjustment, saturation adjustment and sharpness enhancement that are used to optimize the images.

Further, when the composite frames are continuously outputted, the continuously-outputted multiple composite frames are transmitted to an external system according to a time sequence so as to generate the synchronized multiple sets of continuous frame images by performing a decoding procedure.

In an aspect, the multi-module imaging system is disposed in a drive recorder. The drive recorder includes a communication circuit that is used to transmit the multiple composite frames to the external system in a wireless or wired connection manner.

The camera assembly includes an infrared module and at least one visible light module, and the composite frame includes an infrared image generated by the infrared module and at least one visible light image generated by the at least one visible light module.

Further, the multi-module imaging system can be applied to an automatic license plate recognition that acquires a license plate image by the infrared module and an environmental image having the vehicle by the visible light module. The automatic license plate recognition system is used to recognize the characters combining English alphabets and numbers in the license plate image. The recognized characters can also be combined into the composite frame.

Still further, the camera assembly adopts a global shutter that allows all of the light-sensing pixels of the infrared module and at least one of the visible light modules to be synchronously exposed at the same time so as to generate the frame images.

Further, the multiple frame images that are obtained at the same time form the composite frame by a stitching procedure by a data processor. In particular, a vertical encoding procedure is used to stitch the multiple frame images that are obtained at the same time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following descriptions and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
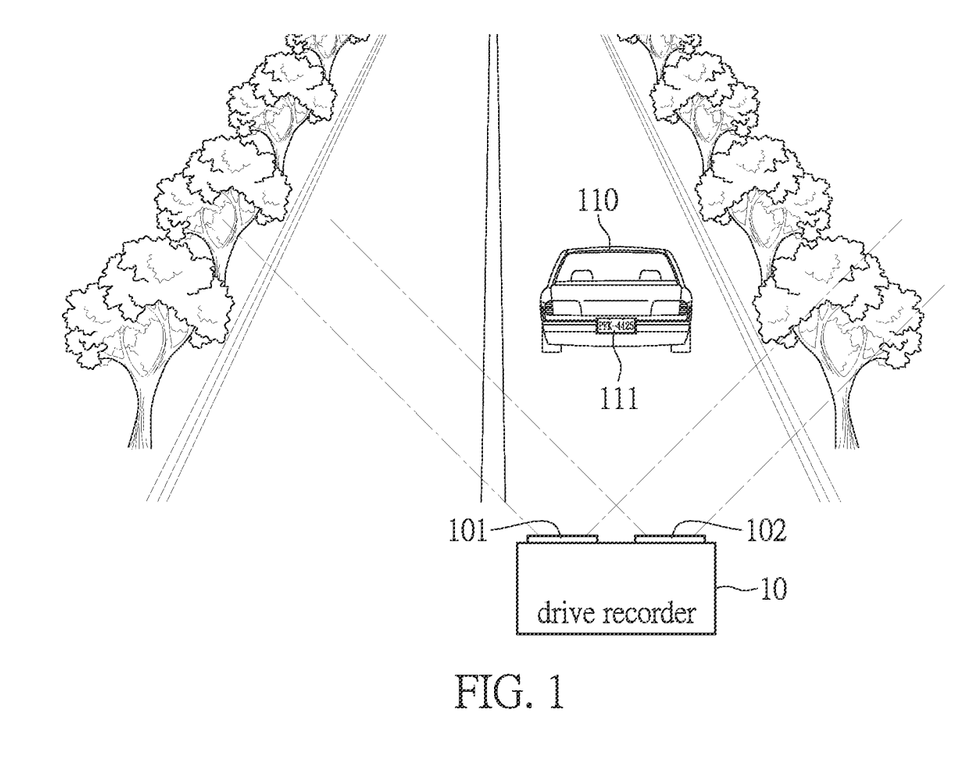
FIG. 1 is a schematic diagram illustrating a circumstance that a multi-module imaging system is used to capture images in one embodiment of the present disclosure.

The present disclosure relates to a multi-module imaging system and an image-synchronization method. The multi-module imaging system includes multiple camera assemblies. For example, the multiple camera assemblies are installed in an electronic device. The multiple camera assemblies include multiple lenses, multiple light-sensing elements and a processing circuit. Reference is made to FIG. 1, which is a schematic diagram illustrating a circumstance that the multi-module imaging system is used to capture images.

A drive recorder 10 installed in a vehicle is used to capture images in front of the vehicle. In particular, the drive recorder 10 includes the multi-module imaging system. The present example shows that the multi-module imaging system includes a first camera module 101 and a second camera module 102. These two camera modules can respectively include their own camera lenses for capturing two overlapped images at two different viewing angles in front of the vehicle. A front vehicle 110 is included in the overlapped images. One of the objectives of the multi-module imaging system is to capture and recognize an image of a license plate 111 of the vehicle 110.

In one further embodiment of the present disclosure, for license plate recognition, a clear license plate image is required. The drive recorder 10 can be use the image-sensing elements in various wave bands, e.g., two or more visible light-sensing elements, or an assembly of an infrared light-sensing element and a visible light-sensing element, to acquire images. For example, the infrared light-sensing element is used to obtain a license plate image in an infrared wave band, and the visible light-sensing element is used to obtain a color image. The camera assembly can also include a light-sensing element with a global shutter (GS). All of the sensitive pixels of the light-sensing elements including the infrared module and at least one visible light module are sensitive to the light at the same time so as to generate frame images that are synchronously exposed by the light-sensing elements. The further advantages of using the global shutter are such as preventing image distortion and reducing heating of the light-sensing elements through the light-sensing element and the infrared light source (e.g., an IR LED flash) of the global shutter at a high-speed synchronized exposure time.

Taking a police vehicle as an example, the drive recorder 10 installed in the police vehicle can capture the front images in a full time when the police vehicle is driving and can recognize multiple license plates (including the license plate 111) of multiple vehicles (including the vehicle 110) in real time by capturing the images during law enforcement. In addition to recognizing the license plate, the drive recorder 10 of the police vehicle can determine traffic and road conditions based on the front images.

Figure 2A:
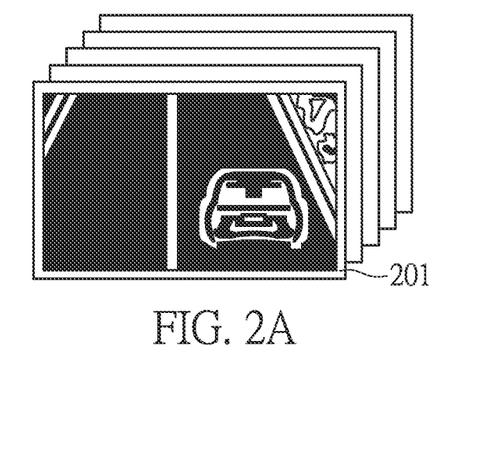
FIG. 2A is a schematic diagram illustrating a bright license plate image with a black-filtered background captured by an infrared module.
Figure 2B:
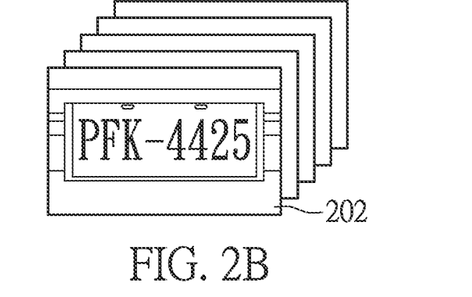
FIG. 2B is a schematic diagram illustrating images that are continuously generated by a first camera module.
Figure 2C:
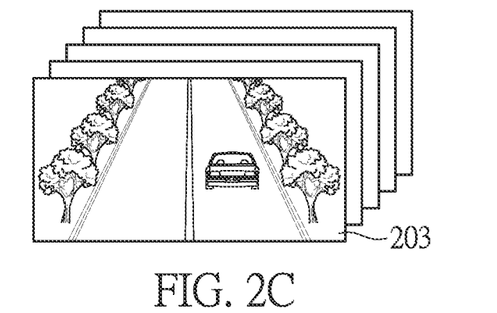
FIG. 2C is a schematic diagram illustrating images that are continuously generated by a second camera module.

FIG. 2A to FIG. 2C are schematic diagrams illustrating the images generated by the multi-module imaging system according to certain embodiments of the present disclosure.

FIG. 2A is a schematic diagram of a front image of a vehicle captured by an infrared module. A series of infrared images 201 shown in the diagram are the images with a narrow viewing angle and each of which includes a bright license plate image with a black-filtered background.

FIG. 2B and FIG. 2C are schematic diagrams depicting visible light images generated by the multi-module imaging system according to one embodiment of the present disclosure. The multi-module imaging system recognizes a license plate image in an image by an image-processing method or an intelligent model.

FIG. 2B shows that the multi-module imaging system continuously generates license plate images 202 by the camera modules and can be recognized by an image-processing process or an intelligent model. FIG. 2C schematically shows a series of visible light images 203 that are generated by the visible light module. One of the visible light images 203 covers the image of a whole scene in front the vehicle.

Rather than the conventional technologies that use a post-production process to synchronize the continuous images captured by the camera modules, the multi-module imaging system of the present disclosure directly combines the images outputted by an image signal processor (ISP) of the multi-module imaging system. In other words, rather than respectively outputting the continuous images generated by the different camera modules, the multi-module imaging system continuously outputs a series of composite frames.

Figure 3:
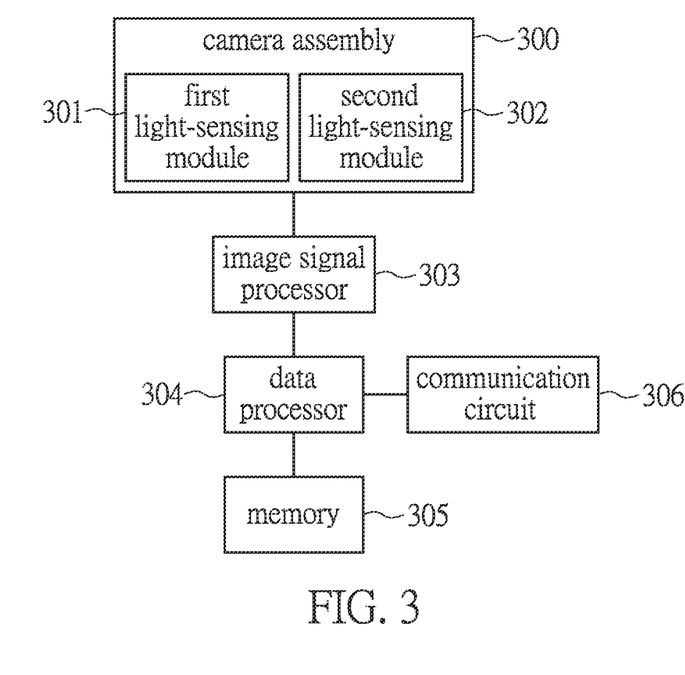
FIG. 3 is a schematic diagram of circuit elements of the multi-module imaging system according to one embodiment of the present disclosure.

Reference is made to FIG. 3, which is a circuit diagram of the multi-module imaging system according to one embodiment of the present disclosure. The multi-module imaging system shown in FIG. 3 can be installed in a drive recorder. Main circuits of the system include a camera assembly 300 having multiple light-sensing modules that are electrically interconnected, an image signal processor 303, a data processor 304 and a memory 305. The multi-module imaging system also includes a communication circuit 306 that can transmit images to an external system in a wireless or wired communication manner.

The camera assembly 300 of the multi-module imaging system includes multiple light-sensing modules such as a first light-sensing module 301 and a second light-sensing module 302 of FIG. 3. The light-sensing element is, but not limited to, used to sense the light at a specific wave band. In one of the embodiments of the present disclosure, the first light-sensing module 301 can be an infrared module that is used to capture an infrared image, and the second light-sensing module 302 can be a visible light module that is used to capture a visible light image. The quantity of the light-sensing modules is not limited to the diagram shown in FIG. 3.

The image signal processor 303 of the multi-module imaging system is used to process the signals sensed by the first light-sensing module 301 and the second light-sensing module 302 and convert the signals into an image data. Taking the infrared module and the visible light module as an example, the image signals processed by the image signal processor 303 render an infrared image and a visible light image.

Further, the multi-module imaging system generates multiple sets of motion images by multiple light-sensing modules of the camera assembly 300. The image signal processor 303 can then perform an image-processing procedure on each of the sets of motion images. The image-processing procedure includes one or any combination of noise reduction, color correction, white balance adjustment, contrast adjustment, saturation adjustment, and sharpness enhancement that are used to optimize the images.

The motion images generated by the image signal processor 303 include continuous frame images. The multiple light-sensing modules respectively generate multiple sets of continuous frame images that can firstly buffered in the memory 305. An image synchronization procedure is performed after the motion images are obtained by the data processor 304. The frame images generated at the same time are received by the image signal processor 303, and the frame images can be combined (e.g., being stitched) so as to generate a composite frame. The composite frame can be transmitted to an external system via a communication circuit 306.

In one further embodiment of the present disclosure, the camera assembly of the multi-module imaging system includes an infrared module and at least one visible light module that respectively generate continuous infrared frames and continuous visible light frames. The composite frame can therefore be a combination of an infrared image and at least one visible light image.

Taking a drive recorder installed in a police vehicle as an example, the multi-module imaging system operated in the drive recorder can continuously generate the composite frames including the multiple images that are synchronized and stitched. A first image of the composite image can be an infrared image that is used to obtain a license plate image not affected by an ambient light. A second image can be a visible light image of an entire scene in front of the vehicle. The continuously-generated composite frames can be transmitted to a computer device of the police vehicle via a communication circuit of the drive recorder. The composite frames can be provided for further law enforcement. On the other hand, the composite frames can be transmitted to a control center for future reference.

Figure 4:
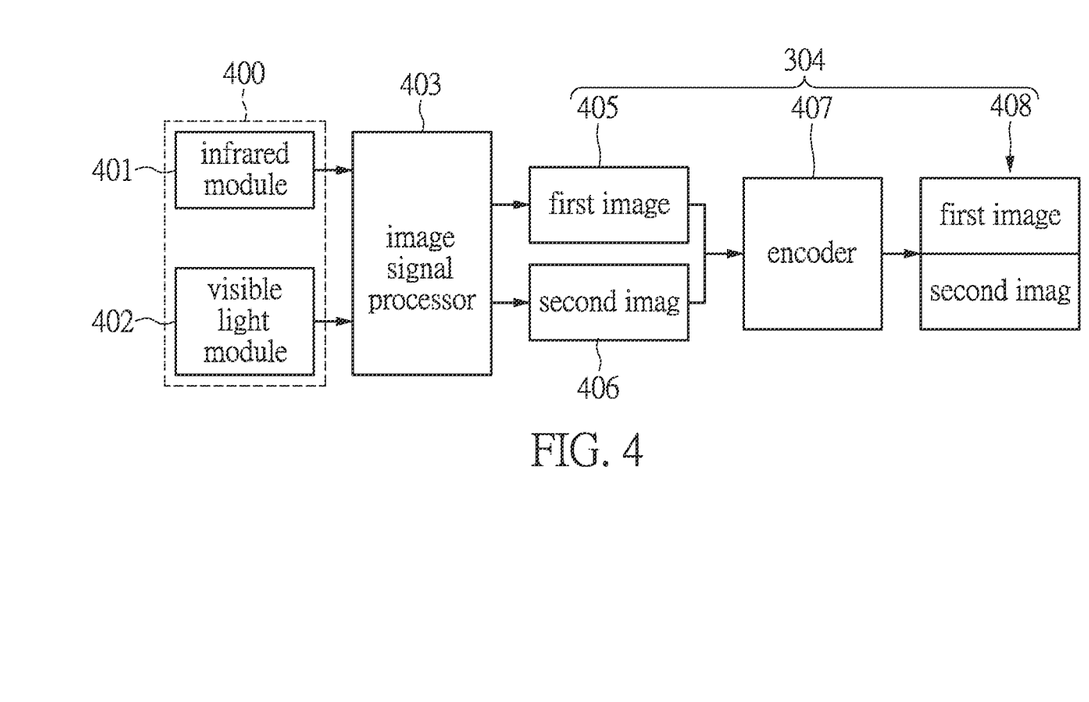
FIG. 4 is a schematic diagram illustrating a composite frame that is obtained by performing a vertical encoding procedure according to one embodiment of the present disclosure.

Reference is made to FIG. 4, which is a schematic diagram illustrating a composite frame that is obtained by performing a vertical encoding procedure according to one embodiment of the present disclosure.

A camera assembly 400 of the multi-module imaging system includes an infrared module 401 and a visible light module 402. The multi-module imaging system can be applied to an automatic license plate recognition (ALPR) system for capturing the license plate images not affected by an ambient light by the infrared module 401, and therefore the ALPR system can recognize the license plate in a scene under a low light source, a bad weather or a poor visibility. The ALPR system can continuously recognize the characters combining English alphabets and numbers of the license plate image. In the meantime, the visible light module 402 is used to acquire an environmental image having the vehicle. The environmental image can be a visible light image that is a color image formed by red, blue and green lights. The visible light image is used to identify a color of the vehicle, a brand of the vehicle, a manufacturer of the vehicle, a model of the vehicle and other details.

The multi-module imaging system generates signals of multiple sets of motion images that are captured by multiple light-sensing modules such as the infrared module 401 and the visible light module 402. The image signals that are generated at the same time are processed by an image signal processor 403 for forming a first image 405 and a second image 406. The data processor 304 of the multi-module imaging system of FIG. 3 performs an encoding procedure. As shown in the diagram, an encoder 407 is used to perform encoding on the first image 405 and the second image 406 so as to form a composite frame 408 in a stitching manner. For example, the composite frame 408 can be a stitched frame by stitching multiple frame images by performing a vertical encoding procedure.

The composite frame 408 includes multiple frame images that are generated by the camera assembly 400 at the same time. The multi-module imaging system can synchronously output multiple frame images generated by different light-sensing modules without synchronizing the images according to the time information of the images in any post-production process.

Figure 5:
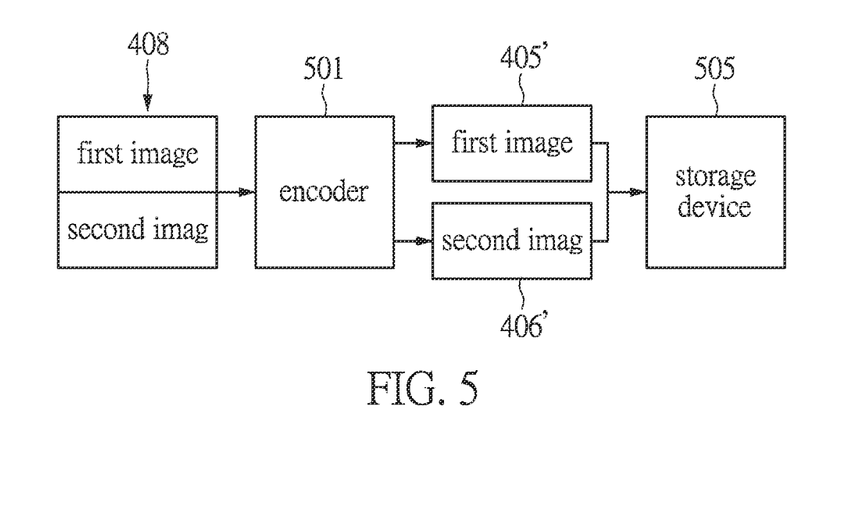
FIG. 5 is a schematic diagram illustrating an external system that is used to decode and separate the frame images according to one embodiment of the present disclosure.

Next, the synchronized composite frame 408 can be transmitted to another system, and reference is made to FIG. 5, which is a schematic diagram illustrating the external system that is used to decode and separate the frame images according to one embodiment of the present disclosure.

When the composite frame 408 including a first image 405 and a second image 406 is transmitted to the external system, the external system is able to decode the composite frame 408 by a decoder 501 according to an encoding format and to separate the composite frame 408 for restoring a first image 405' and a second image 406'. The separated first image 405' and the second image 406' are stored to a storage device 505.

Figure 6:
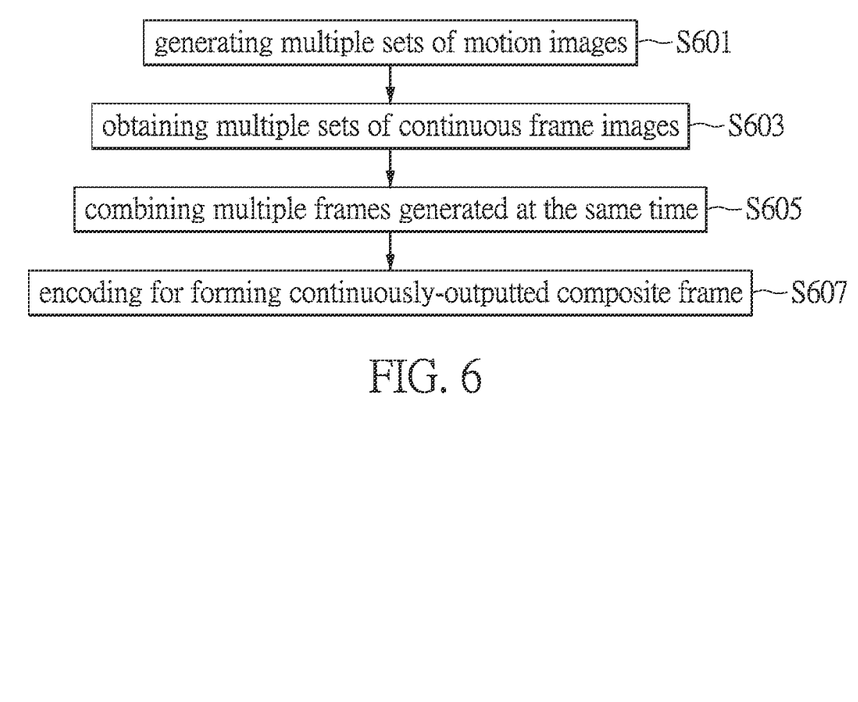
FIG. 6 is a flowchart illustrating an image-synchronization method operated in the multi-module imaging system according to one embodiment of the present disclosure.

Reference is made to FIG. 6, which is a flowchart illustrating the image-synchronization method that forms the composite frame by performing a vertical encoding procedure shown in FIG. 4 according to one embodiment of the present disclosure.

The multiple light-sensing modules of the camera assembly generate multiple sets of motion image (step S601). Referring to the embodiment shown in FIG. 4, the different light-sensing modules such as the infrared module 401 and the visible light module 402 can continuously output the infrared images and the visible light images. Next, the image signal processor 403 extracts a set of continuous frame images from one of the multiple sets of motion images, and multiple sets of continuous frame images can be obtained from the multiple sets of motion image (step S603). The multiple frame images (e.g., the first image 405 and the second image 406) that are captured at the same time can be obtained from the multiple sets of continuous frame images (step S605). The frame images that are captured at the same time can be encoded by the encoder 407 into a composite frame 408 (step S607). Therefore, the multiple sets of motion image can be encoded into continuously-outputted multiple composite frames 408, and each of the composite frames 408 includes multiple frame images that are captured by the camera assembly at the same time. The composite frames are then continuously outputted.

Afterwards, according to one of the purposes of the method, the multiple composite frames are continuously outputted according to a time sequence. Referring to the embodiment shown in FIG. 5, the continuously-outputted composite frames are transmitted to the external system, and the synchronized multiple sets of continuous frame images can be obtained by performing a decoding procedure in the external system. Further, since the infrared image in the composite frame can be a license plate image, the ALPR system operated in the external system can recognize the license plate and combine multiple characters of the license plate into the composite frame.

Figure 7:
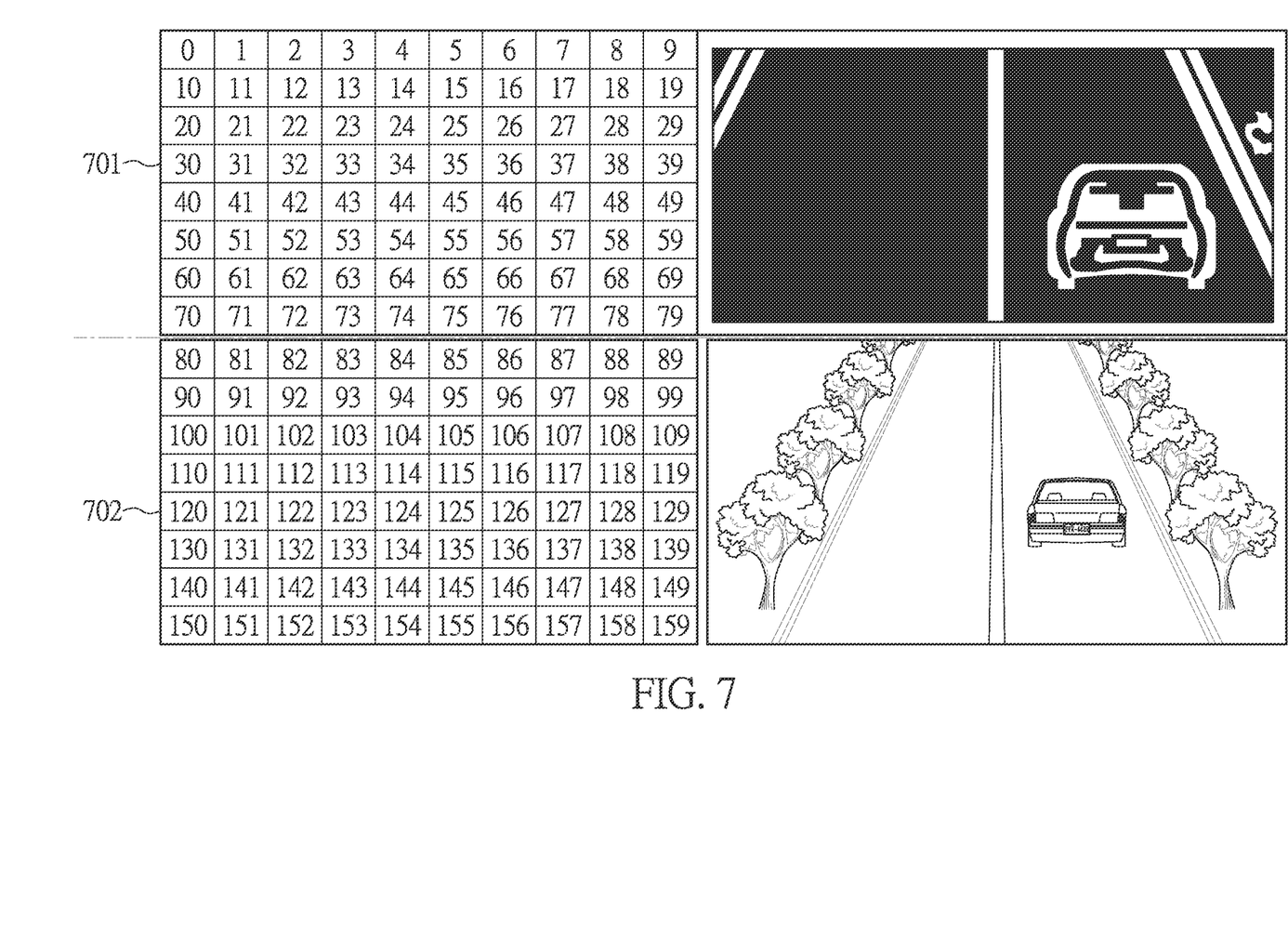
FIG. 7 is a schematic diagram illustrating a composite frame and a corresponding image in one embodiment of the present disclosure.

Reference is made to FIG. 7, which is a schematic diagram illustrating a vertically-stitched composite frame formed by stitching multiple frame images that are obtained at the same time by performing a vertical encoding procedure according to one embodiment of the present disclosure.

A first image 701 shown in the diagram is composed of pixels numbered 0 to 79. A second image 702 vertically adjacent to the first image 701 is composed of pixels numbered 80 to 159. The vertically-encoded first image 701 shown in FIG. 7 corresponds to an infrared image 201 that is captured by the infrared module shown in FIG. 2A. The second image 702 corresponds to the visible light image 203 that is captured by the visible light module shown in FIG. 2C. In certain embodiments of the present disclosure, the composite frame is not limited to the image that is vertically encoded in the diagram, and the composite frame can be a horizontally-encoded image. However, the advantage of the vertically-encoded composite frame is that, without any edge-scanning algorithm, the encoder of the external system can immediately acknowledge a division between the adjacent images of the composite frame by only recognizing the size and the resolution (i.e., the quantity of pixels in a length and a width) of the images.

It should be noted that, taking a composite frame obtained by performing a horizontal encoding procedure as an example, even though the composite frame already includes synchronized images, a horizontal scanning procedure is used to detect edges of the images and the synchronized images can be separated based on the edges. Still further, taking the composite frame obtained by performing a vertical encoding procedure as another example, it is not necessary to scan the edges of the images but to obtain the edges of the images based on size and resolution of the images.

As the embodiment shown in FIG. 7, the external system can acquire image information when receiving the composite frame. For example, since both images are 10 by 8 pixels in length and in width, the external system can recognize that the pixels of the first image are numbered 0 to 79 and the pixels of the second image are numbered 80 to 159 and therefore recognize the division between the two images. It should be noted that the image-synchronization method can be adapted to the composite frame that is obtained by vertically encoding the image with different sizes or resolutions. Correspondingly, the decoder can decode the composite frame according to a known size of the image.

In conclusion, according to the above embodiments that illustrate the multi-module imaging system and the image-synchronization method, the system includes a plurality of light-sensing modules that can capture multiple images including an infrared images and visible light images. The infrared image is beneficial to recognize license plate and the visible light image covers the vehicle and the environment. The multi-module imaging system can recognize the license plate and obtain an entire environmental image. Rather than the conventional technologies that require a certain computing capability to synchronize the images, the image-synchronization method utilizes a stitching method to output the synchronized images that are generated at the same time. Furthermore, it is beneficial to use a vertically-encoding method for forming the composite frame since the decoder can quickly separate the stitched images.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-module imaging system, comprising:
    a camera assembly comprising multiple light-sensing modules;
    an image signal processor; and
    a data processor electrically connected with the camera assembly and the image signal processor;
    wherein the multi-module imaging system performs an image-synchronization method, and the image-synchronization method comprises:
        generating multiple sets of motion images by the camera assembly that comprises the multiple light-sensing modules;
        extracting, by the image signal processor, a set of continuous frame images from one of the multiple sets of the motion images generated by one of the multiple light-sensing modules of the camera assembly, so that the multiple sets of the motion images are provided to obtain multiple sets of the continuous frame images; and
        forming, by the data processor, a composite frame by combining multiple frame images that are captured at a same time from the multiple sets of the continuous frame images, so as to encode the multiple sets of the motion images into continuously-outputted multiple composite frames; wherein:
            the composite frame comprises the multiple frame images that are generated by the camera assembly at the same time, so that the multi-module imaging system is capable of synchronously outputting the multiple frame images generated by different ones of the multiple light-sensing modules, and
            the continuously-outputted multiple composite frames that are encoded by the data processor are transmitted to an external system according to a time sequence, so as to generate the multiple sets of the continuous frame images that are synchronized by performing a decoding procedure.

2. The multi-module imaging system according to claim 1, wherein the image signal processor performs an image-processing procedure on each of the multiple sets of the motion images, and the image-processing procedure comprises one or any combination of noise reduction, color correction, white balance adjustment, contrast adjustment, saturation adjustment, and sharpness enhancement.

3. The multi-module imaging system according to claim 1, wherein the multi-module imaging system is disposed in a drive recorder, and the drive recorder comprises a communication circuit that is used to transmit the continuously-outputted multiple composite frames to the external system in a wireless or wired connection manner.

4. The multi-module imaging system according to claim 1, wherein the camera assembly comprises an infrared module and at least one visible light module, and the composite frame comprises an infrared image generated by the infrared module and at least one visible light image generated by the at least one visible light module.

5. The multi-module imaging system according to claim 4, wherein the multi-module imaging system is applied to an automatic license plate recognition system, and the multi-module imaging system acquires a license plate image of a vehicle by the infrared module and an environmental image that comprises the vehicle by the at least one visible light module.

6. The multi-module imaging system according to claim 5, wherein the automatic license plate recognition system is used to recognize multiple characters that combine English alphabets and numbers in the license plate image.

7. The multi-module imaging system according to claim 6, wherein the multiple characters recognized from the license plate image by the automatic license plate recognition system are combined into the composite frame.

8. The multi-module imaging system according to claim 4, wherein the camera assembly adopts a global shutter that allows all light-sensing pixels of light-sensing elements of the infrared module and the at least one visible light module to be synchronously exposed at a specific speed, so as to generate the multiple frame images.

9. The multi-module imaging system according to claim 1, wherein the composite frame formed by the multiple frame images that are obtained at the same time is a stitched frame formed by combining the multiple frame images by the data processor in a stitching manner.

10. The multi-module imaging system according to claim 9, wherein the data processor stitches the multiple frame images that are obtained at the same time by a vertical encoding procedure.

11. An image-synchronization method performed in a drive recorder, comprising:
    generating multiple sets of motion images by a camera assembly that comprises multiple light-sensing modules;
    extracting a set of continuous frame images from one of the multiple sets of the motion images generated by one of the multiple light-sensing modules of the camera assembly, so that the multiple sets of the motion images are provided to obtain multiple sets of the continuous frame images; and
    forming a composite frame by combining multiple frame images that are captured at a same time from the multiple sets of the continuous frame images, so as to encode the multiple sets of the motion images into continuously-outputted multiple composite frames; wherein the composite frame comprises the multiple frame images that are generated by the camera assembly at the same time, so that the multiple frame images generated by different ones of the multiple light-sensing modules are synchronously outputted; and
    transmitting the continuously-outputted multiple composite frames to an external system according to a time sequence, so as to generate the multiple sets of the continuous frame images that are synchronized by performing a decoding procedure in the external system.

12. The image-synchronization method according to claim 11, wherein, after the multiple sets of the motion images are obtained, the image-synchronization method comprises performing an image-processing procedure on the multiple sets of the motion images; wherein the image-processing procedure comprises one or any combination of noise reduction, color correction, white balance adjustment, contrast adjustment, saturation adjustment, and sharpness enhancement.

13. The image-synchronization method according to claim 11, wherein the camera assembly comprises an infrared module and at least one visible light module, and the composite frame comprises an infrared image generated by the infrared module and at least one visible light image generated by the at least one visible light module.

14. The image-synchronization method according to claim 13, wherein the image-synchronization method is performed in an automatic license plate recognition system that acquires a license plate image of a vehicle by the infrared module and an environmental image that comprises the vehicle by the at least one visible light module.

15. The image-synchronization method according to claim 14, comprising using the automatic license plate recognition system to recognize multiple characters that combine English alphabets and numbers in the license plate image.

16. The image-synchronization method according to claim 15, comprising combining the multiple characters recognized from the license plate image by the automatic license plate recognition system into the composite frame.

17. The image-synchronization method according to claim 13, wherein the camera assembly adopts a global shutter that allows all light-sensing pixels of light-sensing elements of the infrared module and the at least one visible light module to be synchronously exposed, so as to generate the multiple frame images.

18. The image-synchronization method according to claim 11, wherein the composite frame is a stitched frame formed from the multiple frame images that are obtained at the same time by performing a vertical encoding procedure.

19. An image-synchronization method, comprising:
generating multiple sets of motion images by a camera assembly that comprises multiple light-sensing modules, wherein the light-sensing modules comprise an infrared module and at least one visible light module;
extracting a set of continuous frame images from one of the multiple sets of the motion images generated by one of the multiple light-sensing modules of the camera assembly, so that the multiple sets of the motion images are provided to obtain multiple sets of the continuous frame images; and
forming a composite frame by combining multiple frame images that are captured at a same time from the multiple sets of the continuous frame images, so as to encode the multiple sets of the motion images into continuously-outputted multiple composite frames; wherein:
the composite frame comprises the multiple frame images that are generated by the camera assembly at the same time, so that the multiple frame images generated by different ones of the multiple light-sensing modules are synchronously outputted,
the composite frame comprises an infrared image generated by the infrared module and at least one visible light image generated by the at least one visible light module, and
the camera assembly adopts a global shutter that allows all light-sensing pixels of light-sensing elements of the infrared module and the at least one visible light module to be synchronously exposed, so as to generate the multiple frame images.

20. The image-synchronization method according to claim 19, wherein the composite frame is a stitched frame formed from the multiple frame images that are obtained at the same time by performing a vertical encoding procedure.

* * * * *